Aug. 10, 1937.   G. PIELSTICK   2,089,761
RESILIENT SHOCK ABSORBING CUSHIONING OF ENGINES
Filed April 8, 1935
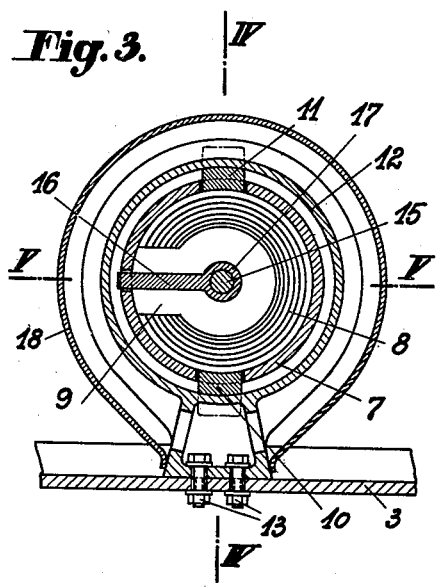
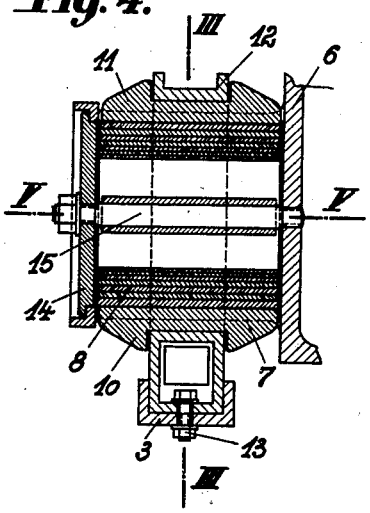
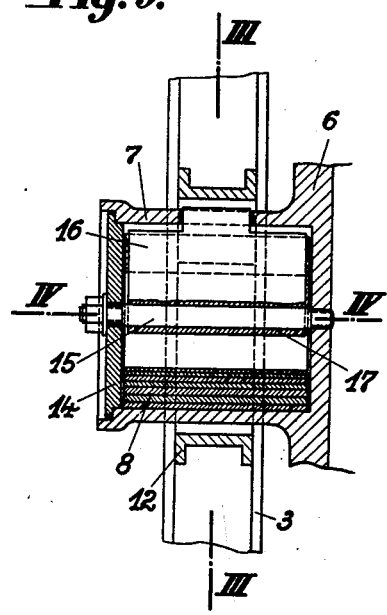
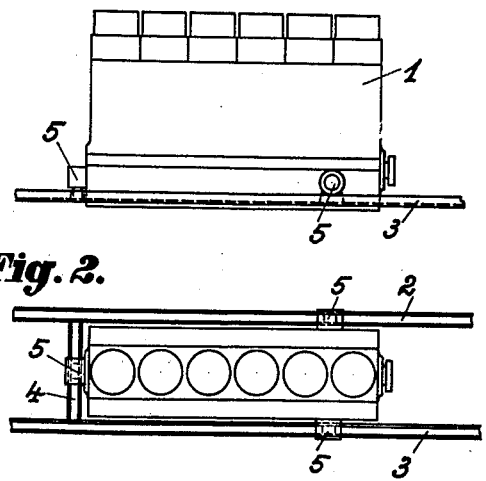
Inventor
Gustav Pielstick
by Maréchal & Noë
attys.

Patented Aug. 10, 1937

2,089,761

UNITED STATES PATENT OFFICE 2,089,761

RESILIENT SHOCK-ABSORBING CUSHIONING OF ENGINES

Gustav Pielstick, Augsburg, Germany, assignor to Maschinenfabrik Augsburg-Nurnberg A. G., Augsburg, Germany, a corporation of Germany Application April 8, 1935, Serial No. 15,246
In Germany April 10, 1934

5 Claims. (Cl. 248—8)

This invention relates to resilient shock-absorbing cushioning of engines which are subjected to vibrations in relation to their beds or supporting structures, its object being to prevent the transmission of the vibrations of an engine to its bed. It is particularly useful for example in the case of internal combustion engines used to drive vehicles, aeroplanes, air ships or the like which are exposed to vibrations which have a disadvantageous effect on the frame of the vehicle, while in the case of prime movers and working machines in factories damage to the building is caused as a result of these vibrations.

In such cases, it has been endeavoured to obtain a remedy by using spiral springs or a material having a damping action, for example rubber, to support the engine. The spiral springs are certainly resilient, but they have practically no damping capacity. As compared therewith, an advance, although a small one, is obtained by mounting the engine on rubber cushions, as the damping capacity of the rubber (about 30%) is capable of taking up a part of the vibration shocks, but in the case of rubber cushioning the low mechanical strength of the rubber, which has led to an early destruction of the rubber cushions, has been found unsatisfactory.

According to the invention, one or more shock absorbers are interposed between the engine and the bed, in which the damping is effected by slotted sleeve springs of the character disclosed in my prior Patent No. 2,039,342, patented May 5, 1936, fitted one into the other and mounted perpendicularly in relation to the direction in which the force is exerted, the said sleeve springs being loaded directly and in a radial direction by the part to be supported. These springs have an exceptionally great damping capacity (about 70%), which renders them highly suitable for use for the vibration-free erection or suspension of engines.

In order that the said invention may be clearly understood and readily carried into effect, the same will now be described more fully with reference to the accompanying drawing in which the invention is illustrated in a practical example.

Figures 1 and 2 constitute a diagrammatic illustration of the resilient mounting of an internal combustion engine in a bed frame, for example a vehicle frame, in side elevation and in plan, Figure 3 is a cross-section through the resilient cushioning device on the line III—III in Figures 4 and 5, Figure 4 is a longitudinal section on the line IV—IV in Figures 3 and 5, Figure 5 is a longitudinal section on the line V—V in Figures 3 and 4.

In Figures 1 and 2, the reference numeral 1 indicates an internal combustion engine, 2 and 3 the longitudinal girders and 4 a transverse girder of a bed frame. The internal combustion engine 1 is mounted on the frame at three points by means of shock-absorbing cushioning devices 5. One of these devices 5 is shown in several sections on a larger scale in Figures 3 to 5.

The reference numeral 6 indicates a part of the lower frame of the internal combustion engine 1, the said engine frame having a suitable number of cylindrical projections 7, in the inner hollow space of which slotted sleeve springs 8 are so inserted that the slot or open side 9 of the sleeve spring 8 extends perpendicularly or almost perpendicularly in relation to the direction of the tension or impact, the sleeve springs consequently being stressed transversely to their longitudinal axis. In the cylindrical frame projection 7 are provided two slots, in each of which a jaw (10 and 11 respectively) is inserted, the said slots lying diametrically opposite to one another in the direction of the tensile or percussive force. The jaws 10 and 11 bear directly on the outer spring of the sleeve springs 8, and in corresponding recesses on the outer circumference of the said jaws a ring 12 is fitted, which is secured to the girders of the vehicle frame. The securing may be effected either by screws 13 or in any other suitable manner. The cylindrical frame projection 7, in which the sleeve spring 8 is accommodated, is preferably closed by a cover 14, whereby a closed spring casing is formed, into which grease may be fed to lubricate the sleeve spring. The securing of the cover 14 is effected, in the case of the illustrated constructional example, by means of a bolt 15 provided with a screwthread at both ends and screwed into the engine frame 6, a sleeve 17 provided with a rib 16 being fitted over the centre part of the said bolt 15. The rib 16 passes through the longitudinal slot 9 of the sleeve spring and projects with its free end into a slot in the cylindrical frame projection 7, so that it is thereby held in a predetermined position. This arrangement permits only a slight turning of the spring inside the cylindrical projection 7, so that the spring is always stressed only in the most favourable manner, namely in the plane perpendicular to the plane of the slot. The entire spring joint is surrounded by a protective cover 18 to prevent the penetration of foreign bodies, dust, water, dirt or the like.

In cases where particularly high stresses are set up, a solid cylindrical core can be inserted in the inner hollow space of the sleeve spring 8 which core bears against the culminating line of the spring lying opposite the spring slot 9, its outer diameter, however, being somewhat smaller than the inner diameter of the innermost spring sleeve. The sleeve spring 8 then rolls on this core according to the load, so that the spring characteristic asymptotically approaches the spring limiting line and the resilience remains approximately constant over the entire loading range, even in the case of maximum loads. The spring-limiting core may be suitably connected with the sleeve 17 provided with the rib 16.

The arrangement of the cushioning devices 5 between the engine and the bed may also be such that the cylindrical projections 7 are provided on the bed and the ring 12 is connected with the frame of the engine.

The expression "bed" here signifies not only in the usual way a solid structure support for the erection of engines, but everything serving to support the engine in question, including, for example, vehicle, aeroplane or air-ship frames, irrespective of whether the engine is mounted or suspended.

What is claimed is:

1. Supporting means adapted to yieldingly support an engine on its bed comprising a housing having a substantially cylindrical wall portion, a series of nested open sided spring sleeves enclosed for substantially their full length in said housing with the outermost sleeve normally engaging said housing wall except for diametrically opposite areas, each sleeve having a substantially uniform curvature from end to end thereof, and a member mounted for movement relatively to said housing in a substantially radial direction and engaging intermediate portions of opposite sides of said spring sleeve series at said diametrically opposed areas.

2. Supporting means of the character described comprising a housing having a substantially cylindrical housing wall provided with diametrically opposed openings, a series of nested open sided spring sleeves in said housing, with the outermost sleeve normally engaging said housing wall, and an outer relatively movable member having limited movement radially with respect to said housing and having spring engaging portions operable through said openings, said spring sleeves yieldingly interconnecting said housing and said member.

3. Supporting means of the character described comprising a substantially cylindrical housing wall, a series of nested open sided spring sleeves within said housing with the outermost sleeve normally engaging said housing wall and with each sleeve having frictional engagement with an adjacent sleeve throughout substantially its entire length and width, and an outer annular member normally co-axial with said housing, said outer member having inwardly extending thrust portions, and said housing wall having diametrically opposed openings through which said thrust portions extend for engagement with opposite sides of said spring sleeve series.

4. In combination, a frame part, an engine part, supporting means yieldingly supporting said engine part on said frame part, said supporting means comprising a housing fixed to one of said parts and having a substantially cylindrical wall, a series of nested open sided spring sleeves in said housing each of said spring sleeves being of substantially uniform curvature from end to end thereof, with the outermost sleeve normally in frictional engagement with said housing wall and with each sleeve frictionally engaging an adjacent sleeve throughout substantially its entire extent, and a member fixed to the other said part and mounted for movement relatively to said housing in a direction substantially radially of said housing and engaging diametrically opposite sides of said spring sleeve series, and means locating said spring sleeves so that their open sides are maintained at a distance from said member.

5. Supporting means of the character described comprising a housing having a wall, a series of nested open-sided spring sleeves in said housing and engaging said wall, each sleeve having a substantially cylindrical curvature from end to end thereof and adapted for frictional rubbing engagement with an adjacent sleeve, a member mounted for movement relatively to said housing in a direction substantially radial of said spring sleeves, said member having a portion extending through said wall into engagement with the outer spring sleeve, and means in said housing cooperating with the ends of said spring sleeves for maintaining the ends of the spring sleeves at a distance from said member.

GUSTAV PIELSTICK.